Nov. 8, 1966  M. S. SHEBANOW ET AL  3,283,770
PNEUMATIC REED RELAY
Filed Sept. 12, 1963
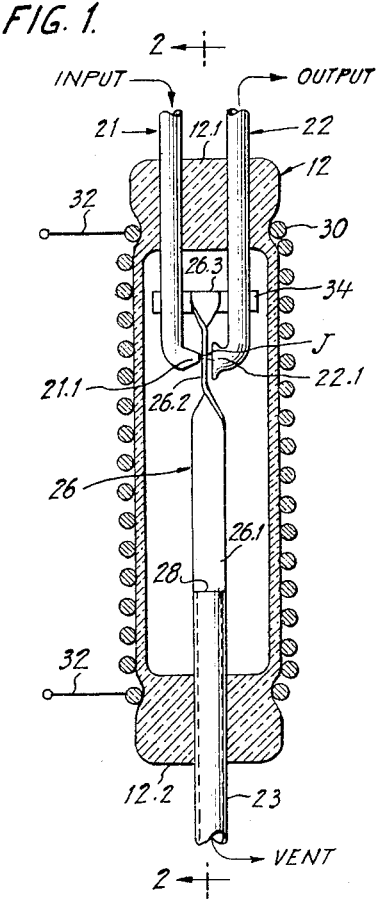
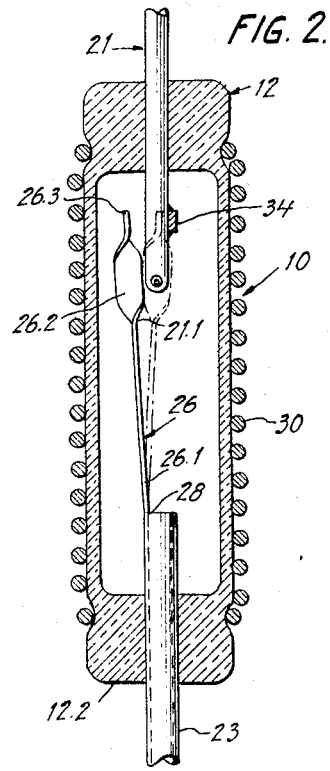
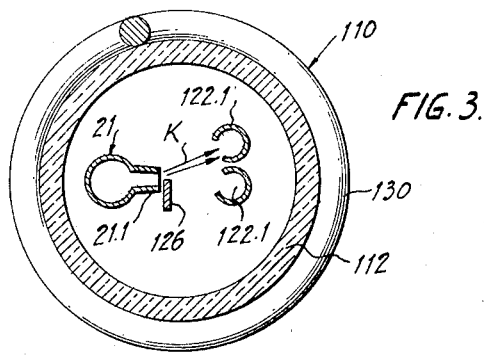
INVENTORS.
MICHAEL S. SHEBANOW
EDWIN R. PHILLIPS
BY Louis Altman
ATTORNEY

3,283,770
PNEUMATIC REED RELAY
Michael S. Shebanow, Medfield, Mass., and Edwin R. Phillips, Westport, Conn., assignors to Sperry Rand Corporation, New York, N.Y., a corporation of Delaware
Filed Sept. 12, 1963, Ser. No. 308,509
6 Claims. (Cl. 137—83)

This invention relates to an electrically controlled relay device for performing fluid switching functions in data processing and/or control apparatus.

Fluid systems are widely used as the power drive in various kinds of controls. (The fluids employed in these devices may be either liquids or gasses; hence the term "fluid" is used in that sense in this specification and the appended claims.) In the case of automatic control systems, an electronic computer is often used to perform the logic operations. The computer must then actuate the fluid power system in accordance with the logical decisions reached. Therefore there is a need for devices in which the electrical output of a computer is converted into a change useable in the fluid power system. Accordingly, it is one object of this invention to provide a relay or transducer which yields a fluid pressure output in response to an electrical input.

Fluid switching devices are also used instead of their electrical counterparts in various types of logic-performing apparatus, such as data processing or automatic control equipment. In some situations it may be desired to employ an electrical input to control such apparatus. Therefore another object of this invention is to provide an electrically actuated device suitable for performing switching operations in fluid logic-performing apparatus.

Other objects are to provide a rugged, long-lived, reliable, fast-acting, compact, and self-contained fluid switch.

In carrying out the invention, the fluid switch employed is of the type in which the fluid flow is controlled by the positioning of a solid valve member. Such devices are well-known in the fluid control art, and in the past have been electromagnetically actuated, as for example by a solenoid and armature. But these devices have been heavy and slow for use in fast-acting fluid logic apparatus or in conjunction with ultra high speed electronic computing equipment. In accordance with this invention, the valve is adapted for actuation by flux-responsive reed-switching techniques, the result being an electrically actuated, fast-switching, long-lived, reliable, rugged, compact, and self-contained device suitable for the type of application contemplated herein.

These and other features of the invention will be more fully developed in the subsequent detailed description, which includes the following drawings:

FIGURE 1, a longitudinal cross-section of an electrically actuated fluid switch in accordance with this invention;

FIGURE 2, another longitudinal cross-section of the device of FIGURE 1, taken along the lines 2—2;

And FIGURE 3, a transverse cross-section of another embodiment of a fluid switch according to this invention.

Referring specifically to the drawings, FIGURES 1 and 2 are cross-sections of a fluid switch generally designated 10. This includes a combined housing and support 12 in the form of a cylindrical tube closed by end walls 12.1 and 12.2. This tube is manufactured of a non-magnetic material, so as not to interfere with the magnetic forces which are employed for switching. The particular material shown in the drawing is glass, which has the advantage of permitting a view of the interior of the switch. Through the end walls 12.1 and 12.2 of the tube pass two conduits 21 and 22 which comprise the fluid circuit of the device 10. There is a close fit between the tube end walls and these conduits, so that the tube serves as a mounting for the conduits. This type of structure has the advantage of providing a protective shell for the internal switch members, while also keeping out much of the dirt, dust, and other contaminants that tend to interfere with reliable operation. In addition, it provides a compact and self-contained switch unit.

The conduits 21 and 22 terminate in a tapered nozzle 21.1 and a flared receptacle 22.1 respectively, confronting each other across a small space. A fluid input to the conduit 21 is ejected from the nozzle 21.1 and a jet J aimed at the receptacle 22.1. If the fluid reaches the receptacle, it then exits as output from the conduit 22. This output can be connected to any suitable pressure- or flow-responsive device for actuating control or computing apparatus of any kind.

When it is desired to terminate this output, a deflector vane 26 is interposed in the path of the jet J to block it from reaching the receptacle 22.1. Then the jet is no longer recovered by the conduit 22, and instead is dissipated in the interior of the glass tube 12. In order to exhaust the resulting spill-off fluid, there is provided a vent conduit 23 mounted on the opposite end wall 12.2 of the tube. This vent conduit also serves as a mounting for the deflector 26, which has one end butt-welded at 28 to the lip of the vent conduit 23 within the supporting tube 12. The deflector 26 does not interfere with fluid flow through the vent conduit 23.

The deflector 26 is movable because it is made in the form of a thin, flat vane having reed-like flexibility and resilience. From the location 28 at which it is secured to the vent conduit 23, the other end of the reed 26 stands free and extends generally axially through the interior of the tube 12 toward the nozzle 21.1 and receptacle 22.1. Thus the reed 26 can be flexed to move the free end thereof relative to the jet path extending between the nozzle and receptacle. To provide bistable switching, the reed 26 has two positions. In its normal position (solid line representation, FIGURE 2), it is sidewardly displaced from the nozzle 21.1 and thus from the jet path, to allow recovery of the jet by the receptacle 22.1. Near the vent conduit 23 the flat dimension of the base section 26.1 of the vane-like deflector is generally parallel to the jet path, so that in flexing perpendicularly to this flat dimension the vane 26 moves toward and away from the jet J for interposition and retraction. The section 26.2 of the vane which is actually interposed in the jet J is twisted generally perpendicularly to the path of the jet for more effective blockage thereof. It will be appreciated that the flexible reed-like deflector 26 is much lighter and easier to switch than the rigid, massive, bearing-mounted valving structures commonly employed.

Flux reed switching techniques are used for switching this device 10. A solenoid coil 30 is wound circumferentially about the cylindrical wall of the supporting tube 12, using the latter as a coil form. Electrical leads 32 connected to the opposite ends of the coil are illustrated schematically. These leads are brought out to a pair of terminals which may then be connected to any suitable electrical signal input. When electrically energized, the coil 30 sets up a magnetic flux which is oriented axially within the interior of the tube 12. The conduits 21 and 22, the vent 23, and the deflector reed 26 are all formed of an appropriate low remanence, low coercive force, ferromagnetic (i.e. very high permeability, low reluctance) material, for example, a soft iron alloy. In addition a small bar 34, also made of this type of material, is affixed to the conduits 21 and 22 and extends transversely therebetween to form a pole piece. The pole piece 34 is spaced from the normal position of the reed 26, and is positioned on the far side of the jet path from the reed. All these ferromagnetic members 21, 22, 34, 26 and 23 combine to form a low reluctance magnetic flux path extending generally axially through the interior of the tube 12 and coil 30. Thus, when the coil is energized by the application of an electrical signal across its terminals, the resulting axial flux within the interior of the tube and coil is channeled through the conduits and flapper.

However, there is a high reluctance air gap in the space between the reed 26 and the pole piece 34. As is known in the flux reed switching art, when spaced ferromagnetic members conduct a flux, the magnetic forces tend to cause them to snap together so as to close the high reluctance air gap between them. Thus the reed 26 is attracted toward the pole piece 34 and is consequently interposed in the path of the jet J to interrupt the fluid circuit. The outer tip 26.3 of the reed 26 is twisted to abut flat against the pole piece 34. Thus the pole piece establishes the limit of movement of the reed 26 when it is attracted thereto. This is the other one of the two positions of the reed 26 (dashed representation, FIGURE 2).

The reed 26 is held in contact with the pole piece 34 as long as the solenoid 30 is energized to generate a magnetic flux. When the solenoid is de-energized the low remanence of the ferromagnetic members 21, 22, 34, 26, and 23 allows the magnetic attraction to terminate, and the inherent resilience of the reed 26 then causes it to spring back to the position of FIGURE 2, in which it no longer blocks the fluid jet J.

When a light reed such as the deflector 26 is employed, the switching action is considerably faster than the response usually achieved by an ordinary solenoid moving a massive armature and valve member, with additional inertia often contributed by mechanical linkages. In addition, there is usually some bearing friction at one or more places where the armature and valve member are supported. Here, in contrast, movement of the reed 26 results from its inherent flexibility. Thus no bearings are required, and no bearing friction is introduced. The result is high switching speed, low wear, long operating life, and high reliability.

It will be appreciated that if the normal position of the reed 26 were such as to block the jet J, and the pole piece 34 were positioned so as to attract the reed out of the jet path, then the operation of the device would be reversed. That is, the reed would block the jet when the solenoid was not energized, and allow recovery of the jet when the solenoid was energized, instead of vice versa as in the illustrated device 10.

In either type of device, the fluid output from the recovery conduit 22 would actuate a drive of some kind, while in the absence of such an output there would be no drive. In a fluid computing application, either one of the switching conditions might represent a binary "one," while the other would represent a binary "zero."

And in either type of device it will be seen that the force of the jet J impinging on the twisted section 26.2 does not tend to disturb the condition of the reed 26, because the force of the jet is exerted transverse to the flat dimension of the base section 26.1, therefore transverse to the direction of reed flexure and transverse also to the magnetic forces and spring forces which hold the reed in the attracted or retracted position.

In FIGURE 3 there is seen an alternative embodiment of a fluid switch 110 in accordance with this invention. This device recovers the jet K in either switching condition, thus combining the features of the illustrated switch 10 with those of the reverse embodiment suggested above. This embodiment is similar in all respects to that of FIGURES 1 and 2, except as noted below. As seen in the transverse cross-section of FIGURE 3, the switch 110 includes a glass capsule 112, a solenoid coil 130 wound circumferentially thereabout, a delivery conduit 21 formed with a jet nozzle 21.1, and a deflector 126, all of which are similar to their correspondingly numbered counterparts in the previously described switch 10.

In the present embodiment, however, there are two alternative output conduits formed with respective receptacle chambers 122.1 and 122.1'. The jet K is aimed at the receptacle 122.1. But the deflector 126 in one of its two positions (which may be either the rest position or the attracted position) prevents the jet from reaching the receptacle 122.1 and instead deflects it into the other receptacle 122.1'. This is the condition which is illustrated in FIGURE 3. In its other position the deflector 126 is retracted from the jet path, allowing the jet K to proceed in the aimed direction to the receptacle 122.1. Thus, this device switches the fluid output from one alternative output conduit to another.

It will now be appreciated that there have been disclosed several useful illustrative embodiments of a fluid switch having utility for performing control or computation functions, and particularly meeting the need for a transducer or relay to link electronic computing systems with fluid power systems in control applications. The device furthermore has the advantages of fast switching response, low wear, durability, long operating life, and high reliability, and is a compact and self-contained unit.

What has been described is a preferred embodiment and is believed to be the best mode of practicing the invention, but it will be clear to those skilled in the art that modifications may be made therein without departing from the principles of the invention. Accordingly this description is intended just as an example, the scope of the invention being stated in the appended claims.

What is claimed is:
1. A fluid relay comprising:
  (a) a tubular housing;
  (b) at least two fluid conduits at least partly fabricated of ferromagnetic material mounted on one end of the housing and extending generally axially into the interior thereof;
  (c) a vent at least partly fabricated of ferromagnetic material mounted on the other end of the housing and extending generally axially into the interior thereof;
  (d) a reed at least partly fabricated of ferromagnetic material, one end of which is secured to the vent and the other end of which extends freely toward the conduits and is flexible for movement relative thereto, the reed cooperating with the conduits and the vent to form a generally axial low reluctance magnetic flux path;
  (e) an electrical coil circumferentially wound about the housing whereby to generate an axial flux;
  (f) one of the conduits being arranged to deliver a jet of fluid and the other arranged to receive the jet when the reed is in a selected position;
  (g) and means on the conduits at least partly fabricated of ferromagnetic material defining a pole normally spaced from the reed to leave a high reluctance gap in the flux path, whereby the reed is moved toward the pole to alter the fluid jet reception conditions in response to axial flux.
2. A device according to claim 1, wherein:
  (a) the plane of movement of the reed extends transversely to a line joining the conduits whereby the reed is interposable into the path of a fluid jet directed from one of the conduits to the other;
  (b) and the pole means is a bar secured to at least one of the two conduits and extending therebetween to attract the reed and establish a limiting position therefor.
3. A device according to claim 2, wherein:
  (a) the reed is a flat vane;
  (b) the part of the vane nearest the vent being oriented with its flat dimension transverse to the direction of flexing thereof;

(c) the vane being twisted so that the part of the vane positioned to be interposed into the path of the jet is oriented with its flat dimension transverse to the direction of jet flow.

4. A device according to claim 3, wherein:
   (a) the receiving conduit is positioned in the jet path;
   (b) and the reed is interposable to at least partially deflect the jet away from the receiving conduit.

5. A device according to claim 3, wherein:
   (a) the receiving conduit is positioned off the jet path;
   (b) and the reed is movable to at least partially deflect the jet toward the receiving conduit.

6. A device according to claim 3, wherein:
   (a) the conduits include a first receiving conduit positioned in the jet path and a second receiving conduit positioned off the jet path;
   (b) the reed being interposable to at least partially deflect the jet from the first receiving conduit to the second receiving conduit.

References Cited by the Examiner
UNITED STATES PATENTS

| | | | |
|---|---|---|---|
| 2,269,072 | 1/1942 | Wilde | 137—83 |
| 3,070,677 | 12/1962 | Lowry | 200—87 |

WILLIAM F. O'DEA, *Primary Examiner.*

ALAN COHAN, *Examiner.*